Aug. 28, 1951     L. T. CONDE     2,565,721
INFLATION MEMBER FOR MILKING MACHINES
Filed Oct. 19, 1948
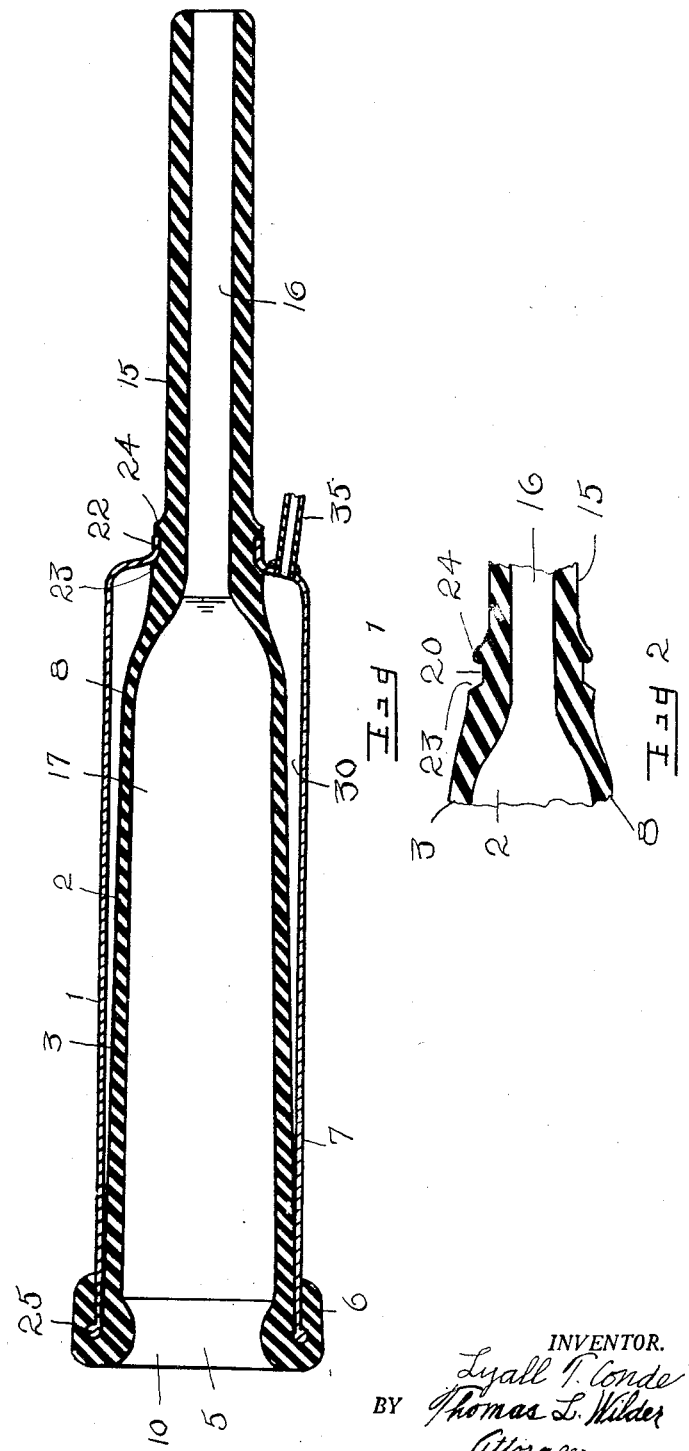
INVENTOR.
Lyall T. Conde
BY Thomas L. Wilder
Attorney Patented Aug. 28, 1951

2,565,721

UNITED STATES PATENT OFFICE 2,565,721

INFLATION MEMBER FOR MILKING MACHINES

Lyall T. Conde, Sherrill, N. Y.

Application October 19, 1948, Serial No. 55,332

1 Claim. (Cl. 119—14.52)

My invention relates to an inflation member for milking machines, and I declare the following to be a full, clear, concise and exact description thereof sufficient to enable anyone skilled in the art to which it appertains to make and use the same, reference being had to the accompanying drawings in which like characters refer to like parts throughout.

The object of the invention is to provide an inflation member that is applied to a cow's teat when milking. Heretofore, the inflation members have been made with the thinnest part of the tapered wall at the top thereof to allow the top part to collapse first under evacuation, and progressively downward, whereby to simulate milking by hand.

The present invention reverses the above theory and makes the thinnest part of the tapered wall of the inflation member at the bottom or milking tube end and its thickest part at the upper or open end, to allow the wall of the inflation member to collapse at the lowest part first and progressively upward, or from the end of the teat up toward the base of the udder, whereby to force the blood from the cow's teat up into the cow's udder to energize the hormones which stimulates the flow of milk and also keeps the cow's teat in normal condition and free from congestion.

Heretofore, in the average milking machine the inflation collapses at approximately the middle of the cup, whereby the squeeze comes in the middle of the teat. This is objectionable for the reason that the end of the teat becomes congested, even black and blue and very hard. When this condition exists, the milk can not be taken from the end of the teat for the reason that the muscles and opening in the end of the teat are so congested that it is impossible to get the rest of the milk until the milking machine has been removed to allow the blood to flow back normally and in some instances to massage the teat by hand before the cow can be again milked.

The present invention overcomes the above handicap by applying the squeeze from the bottom of the teat upwards toward the base of the udder, whereby it will operate successfully to any size teat.

The inflation member has other advantages such as ease with which it can be cleaned and means for preventing the pulling of the rubber member through the metal casing that surrounds the rubber.

The object will be understood by referring to the drawings in which

Fig. 1 is a central vertical section of the inflation member.

Fig. 2 is a detail view showing a central vertical section of a rubber casing employed, parts being broken away.

Referring more particularly to the drawings, the inflation member 1 has an inner casing 2 made preferably of pure rubber. The upper portion 3 is conical in shape and terminates at its upper or teat receiving end in a bead 5 with a portion 6 doubled back upon itself for engaging the upper end of the outer casing or metal teat cup shell 7 hereinbelow mentioned. Furthermore, bead 5 forms a half roll which blends into the body of inflation member 1 in such manner that it seals the cup shell 7 on the cow perfectly without discomfort to the cow and will stay on the teat with a much lower minimum amount of vacuum even as low as 4 inches of vacuum mercury lift. Whereas the lowest vacuum heretofore used is 10 inches mercury lift. Furthermore, the wall of conical part 3 tapers and is thinnest at its lower part 8 and thickest at its upper or open end. The inner wall of said flexible inner casing incloses an area which is substantially cylindrical in shape. The inner casing progressively increases in thickness from its lowest part 8 or milking tube end to its highest part near bead 5 where it is thickest, whereby to allow the lowest or thinnest part 8 to collapse first and then progressively upward in a diminishing ratio.

The upper or bead part 3 tapers outwardly from the lower part 8 thereof to the upper end or bead 5 which is open at 10 to allow part 3 to be slipped up on the cow's teat. The lower tube part 15 is cylindrical having a narrow passageway 16 that communicates with the tapered chamber 17 of upper part 3 for the passage of milk to the pail, not shown.

An annular recess 20 is made in the wall of the upper portion of lower tube part 15 for housing the neck 22 of outer shell 7 made preferably of metal. Said recess 20 is formed by moulding an annular indentation with a shoulder at 23 and a bead at 24.

Casing 7 is cylindrical with its upper end terminating in a bead 25, that is imbedded in the bead 5 of inner casing 2 and neck 22 at its opposite end. A space 30 surrounds the tapered upper portion 3 of casing 2 and the inner surface of outer shell 7 which diminishes towards the top, whereby to cause the collapse first of the lower or thinner wall 8 of lesser resiliency of upper part 3 near the lower end thereof and then gradually in a progressive diminishing ratio towards the top, whereby to force the blood from the cow's teat up into the udder to energize the hormones and to keep the cow's teat in normal condition and free from congestion and thereby stimulate the flow of milk.

A tube 35 is connected by soldering or otherwise at one end to the lower part of casing 7, whereby atmospheric pressure is admitted ordinarily some sixty times a minute to cause the inflation member 1 to press inward against the teat, not shown, to squeeze the teat. This pressure is accomplished between inflation member 1 and shell 7 and causes the inflation to collapse first at the extreme bottom and then progressively upward toward the top or from the end of the teat up toward the base of the udder. Thereafter an evacuation is effected in space 30 with a vacuum equal or higher than that inside inflation member 1 in communication with the cow's teat, thereby causing inflation member 1 to open and the milk to flow since the cow's teat is then subjected to vacuum.

In operation the inflation member is applied to the cow's teat by slipping upper part 3 thereon, whereupon friction as well as suction caused by the vacuum created by the milking machine will hold it in place.

Each alternate impulse of the vacuum in chamber 30 by way of tube 35 will cause the lower or thinner portion of the wall of upper part 3 of casing 1 to collapse progressively in a diminishing ratio upwards to bead 5, whereby to force the blood from the cow's teat up into the udder to energize the hormones to stimulate the flow of milk and to keep the cow's teat in normal condition and free from congestion.

After use the inflation member 1 can be cleaned easily owing to the curved inner surface of the annular bead 5 which avoids corners that would hold back waste. Moreover the neck 22 of casing 7 can not be pulled free easily from its seat in recess 20 of tube part 15 when removing member 1 from the cow's teat.

Having thus described my invention, what I claim as new and desire to secure by Letters Patent is as follows:

In an inflation member for milking machines adapted for use in a rigid teat cup, having a teat end and a tube end, and a flexible casing, a bead formed on the teat end of said casing, said bead having a rolling surface and said flexible casing having inner and outer walls, the outer wall of said casing being tapered inwardly to a greater degree than said inner wall, the said inner wall of said flexible casing having only a slight taper inwardly towards said tube end, and the transverse cross section of said casing being substantially uniform at any selected point, whereby to allow said flexible casing to collapse first at the tube end and then progressively towards the teat end.

LYALL T. CONDE.

REFERENCES CITED

The following references are of record in the file of this patent:

UNITED STATES PATENTS

| Number | Name | Date |
| --- | --- | --- |
| 1,285,079 | Eklundh et al. | Nov. 19, 1918 |
| 1,308,082 | Kock | July 1, 1919 |
| 1,839,765 | Knox | Jan. 5, 1932 |
| 1,916,839 | Hulbert | July 4, 1933 |
| 1,945,386 | Stampen | Jan. 30, 1934 |
| 2,055,718 | Davis | Sept. 29, 1936 |
| 2,079,435 | Dinesen | May 4, 1937 |
| 2,092,605 | Hodson | Sept. 7, 1937 |
| 2,099,884 | Green | Nov. 23, 1937 |
| 2,302,443 | Hodsdon | Nov. 17, 1942 |
| 2,320,229 | Frost | May 25, 1943 |
| 2,340,296 | Bender | Feb. 1, 1944 |
| 2,408,390 | Gessler | Oct. 1, 1946 |